US012019389B2

(12) United States Patent
Izumi et al.

(10) Patent No.: US 12,019,389 B2
(45) **Date of Patent: *Jun. 25, 2024**

(54) IMAGE FORMING APPARATUS

(71) Applicant: Toshiba Tec Kabushiki Kaisha, Tokyo (JP)

(72) Inventors: Takao Izumi, Yokohama Kanagawa (JP); Suguru Kurita, Sunto Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/191,316

(22) Filed: Mar. 28, 2023

(65) Prior Publication Data

US 2023/0305467 A1 Sep. 28, 2023

Related U.S. Application Data

(63) Continuation of application No. 17/674,051, filed on Feb. 17, 2022.

(51) Int. Cl.
*G03G 15/02* (2006.01)
*G03G 15/00* (2006.01)

(52) U.S. Cl.
CPC ................................ *G03G 15/5016* (2013.01)

(58) Field of Classification Search
CPC ............... G03G 15/50; G03G 15/5016; G03G 15/5033; G03G 15/5041; G03G 15/5054; G03G 15/5058
See application file for complete search history.

(56) References Cited

U.S. PATENT DOCUMENTS

| | | | | |
|---|---|---|---|---|
| 6,321,044 | B1 | 11/2001 | Tanaka | |
| 7,877,031 | B2 * | 1/2011 | Fukushi | G03G 15/0855 399/64 |
| 8,380,094 | B2 * | 2/2013 | Tomita | G03G 15/161 399/49 |
| 2009/0034990 | A1 | 2/2009 | Nakazato | |

FOREIGN PATENT DOCUMENTS

| | | |
|---|---|---|
| JP | H0882965 A | 3/1996 |
| JP | 2017009661 A | 1/2017 |

* cited by examiner

*Primary Examiner* — Hoang X Ngo
(74) *Attorney, Agent, or Firm* — Kim & Stewart LLP

(57) ABSTRACT

According to one embodiment, an image forming apparatus, includes a transfer belt onto which toner images are transferred during an image forming operation, and a sensor that emits light towards the transfer belt and detect an amount of light reflected by the transfer belt. A processor adjusts the amount of light emitted towards the transfer belt based on the detected amount of the reflected light, and stores, in a memory, light level information indicating an output level for the amount of light emitted towards the transfer belt by the sensor. The processor provides an instruction for outputting warning information when the light level information indicates the output level exceeds a threshold value.

14 Claims, 14 Drawing Sheets

IMAGE FORMING APPARATUS

CROSS-REFERENCE TO RELATED APPLICATION

This application is a continuation of U.S. patent application Ser. No. 17/674,051, filed on Feb. 17, 2022, the entire contents of which is incorporated herein by reference.

FIELD

Embodiments described herein relate generally to an image forming apparatus.

BACKGROUND

An image forming apparatus includes a toner density sensor for maintaining image density (print quality. The toner density sensor detects the amount of toner adhesion during an image forming process. The image forming process can be controlled so that the amount of toner adhesion falls within an acceptable range.

An optical sensor can be used as the toner density sensor in an image forming apparatus. But with an optical sensor, surfaces of a light emitting element and a light receiving element may become contaminated by scattered toner particles, paper dust, and the like. With such contamination, the desired level of light emission and light reception might not be obtained, such that erroneous control is performed and the correct image density cannot be maintained.

DETAILED DESCRIPTION

In general, according to one embodiment, an image forming apparatus includes a transfer belt, a sensor and a processor. The transfer belt is a belt onto which toner images are transferred during an image forming operation. The sensor is configured to emit light towards the transfer belt and then detect an amount of light reflected by the transfer belt. The processor is configured to: adjust the amount of light emitted towards the transfer belt based on the detected amount of the reflected light; store, in a memory, light level information indicating an output level for the amount of light emitted towards the transfer belt by the sensor; and provide an instruction for outputting warning information when the light level information indicates the output level exceeds a threshold value.

Hereinafter, an image forming apparatus according to certain example embodiments will be described with reference to the drawings. In each drawing, a scale of each component can be appropriately changed or varied. Aspects or components may be omitted from certain drawings for clarity of description.

First Embodiment

Figure 1:
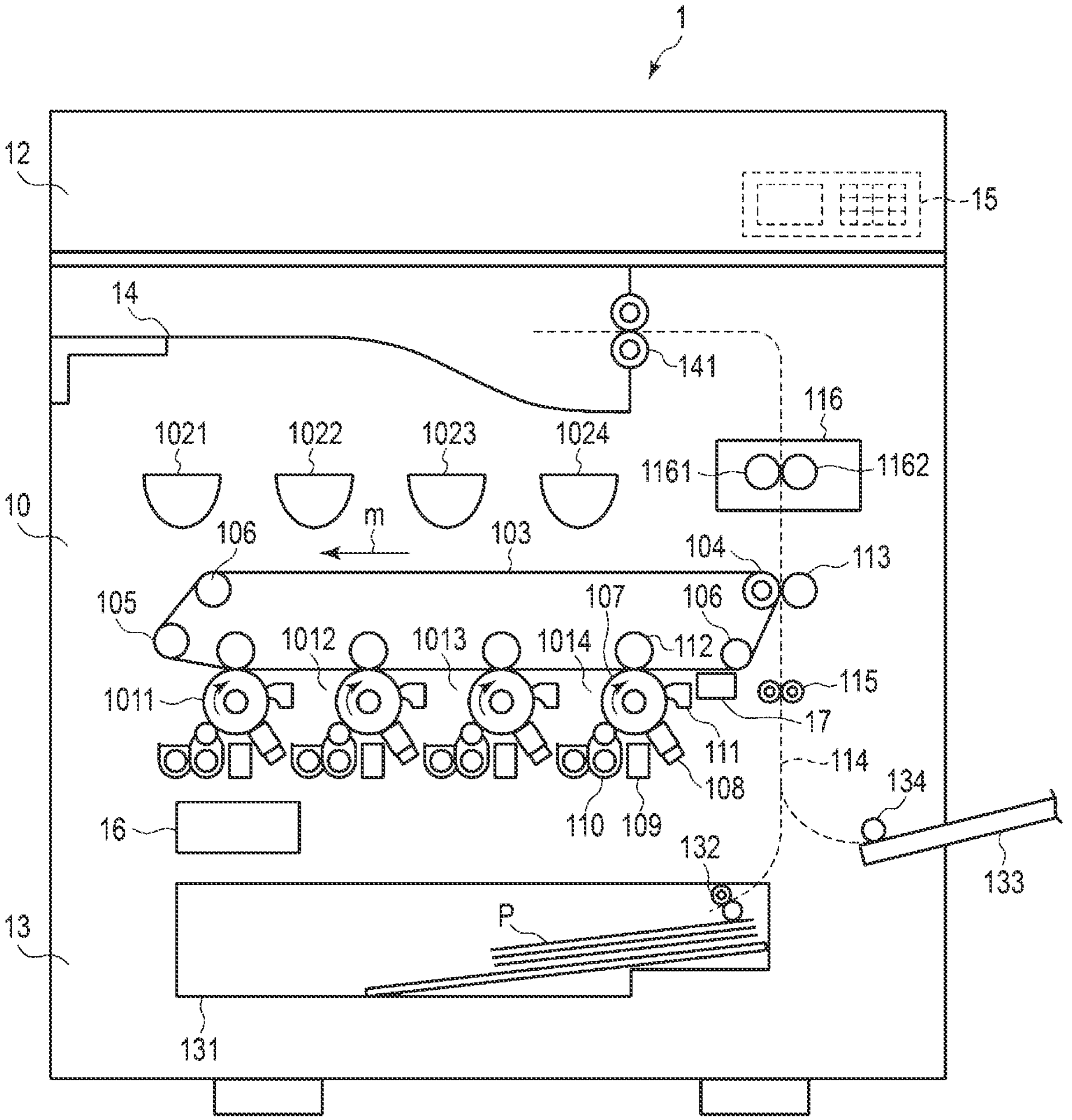
FIG. 1 depicts an image forming apparatus.

FIG. 1 is a schematic configuration diagram illustrating an example of an image forming apparatus 1 according to a first embodiment.

The image forming apparatus 1 includes a printing unit 10, a scanning unit 12, and a control panel 15. The image forming apparatus 1 includes a processor 16 which is a control unit that controls the image forming apparatus 1.

The printing unit 10 includes four image forming stations 1011, 1012, 1013, and 1014 corresponding to toner colors of Y (yellow), M (magenta), C (cyan), and K (black), respectively. The image forming stations 1011, 1012, 1013, and 1014 are disposed side by side along a lower side of a transfer belt 103 that rotates in the direction of the arrow m in FIG. 1. The printing unit 10 includes supply cartridges 1021, 1022, 1023, and 1024 above each of the image forming stations 1011, 1012, 1013, and 1014.

The four image forming stations 1011, 1012, 1013, and 1014 each includes a charging charger 108, an exposure scanning head 109, a developing apparatus 110, and a photosensitive cleaner 111 positioned around a photosensitive drum 107. The developing apparatus 110 includes a two-component developer comprising a toner and a carrier. As a toner anon-decolorable toner or a decolorable toner can be used.

In this context, a decolorable toner is toner that can be decolorized by heating to a decoloring temperature or higher. The decolorable toner includes, for example, a color-developing compound, a color-developing agent, and a decolorable agent as a coloring material. If a toner image formed by using the decolorable toner is subsequently heated to the decoloring temperature or higher, the color-developing compound and the color-developing agent contained in the decolorable toner are dissociated and the toner image becomes decolorized. That is, such a decolorized toner image becomes substantially indistinguishable (visually) from the page background on which the decolorable toner image was printed.

A backup roller 104, a driven roller 105, and a tension roller 106 support the transfer belt 103. The printing unit 10 includes respective primary transfer rollers 112 at locations facing the photosensitive drums 107 of the respective image forming stations 1011, 1012, 1013, and 1014 via the transfer belt 103. The printing unit 10 includes a secondary transfer roller 113 at a location facing the backup roller 104 via the transfer belt 103.

The image forming apparatus 1 includes a paper feeding cassette unit 13 below the printing unit 10. The paper feeding cassette unit 13 includes a paper feeding cassette 131 that stores an image forming medium P and a pickup roller 132 that picks up the image forming medium P from the paper feeding cassette 131. The paper feeding cassette 131 can feed an unused sheet or a reused sheet (e.g., a sheet on which an image has been decolorized by a decoloring process) and the like. The printing unit 10 includes a manual paper feeding tray 133 and a pickup roller 134.

The printing unit 10 includes a registration roller 115 along a conveyance path 114. The printing unit 10 includes a fixing apparatus 116 and a paper discharge roller 141 which are downstream of the secondary transfer roller 113.

The image forming apparatus 1 forms a toner image on the image forming medium P with the printing unit 10 according to image data from the scanning unit 12 or the like, and then discharges the image forming medium P to the paper discharge unit 14. The printing unit 10 includes a plurality of sensors that detect the image forming medium P being conveyed along the conveyance path 114. The printing unit 10 can detect the image forming medium P being conveyed for printing and the image forming medium P being discharged after printing based on the output of signals from the plurality of sensors.

The image forming apparatus 1 may be a monochrome image forming apparatus in some examples, and the number of image forming stations is not particularly limited. In some examples, the image forming apparatus 1 may transfer the toner image directly from a photosensitive body to a sheet rather than to the transfer belt 103. The image forming apparatus 1 may also include a plurality of printing units 10 or the like.

The transfer belt 103 is, for example, an endless belt, and can be rotated by movement of a roller. By the rotation of the transfer belt 103, the transfer belt 103 conveys an image from each image forming unit (1011, 1012, 1013, and 1014) to the secondary transfer roller 113.

The secondary transfer roller 113 transfers (secondary transfer) the toner images formed on the transfer belt 103 to the image forming medium P passing between the secondary transfer roller 113 and the backup roller 104.

The fixing apparatus 116 heats and presses the image forming medium P to which the image is being transferred. Accordingly, the image transferred to the image forming medium P is fixed. The fixing apparatus 116 includes a heating unit 1161 and a press roller 1162 facing each other.

The heating unit 1161 is, for example, a roller including a heat source for heating the heating unit 1161. The heat source is, for example, a resistive heater or a heat lamp. The roller that has been heated by the heat source heats the image forming medium P during the fixing process.

Alternatively, the heating unit 1161 may include an endless belt suspended from a plurality of rollers. For example, the heating unit 1161 includes a plate-shaped heat source, an endless belt, a belt conveyance roller, a tension roller, and a press roller. The endless belt is, for example, a thin film material. The belt conveyance roller drives the endless belt. The tension roller applies tension to the endless belt. An elastic layer is formed on a surface of the press roller. A heat generating unit side of the plate-shaped heat source contacts an inside of the endless belt and is pressed in a direction towards the press roller, thereby forming a fixing nip having a predetermined width between the plate-shaped heat source and the press roller. Since the plate-shaped heat source is configured to perform heating while also forming a nip area, responsiveness at the time of energization is higher than that of a heating method using a halogen lamp.

The press roller 1162 presses the image forming medium P that passes between the press roller 1162 and the heating unit 1161.

The paper discharge unit 14 is a table on which the printed image forming medium P is discharged.

The scanning unit 12 reads an image from a document. The scanning unit 12 is a scanner for reading the image from the document. The scanner can be an optical reduction system including an image capturing sensor such as a charge-coupled device (CCD) image sensor or the like. Alternatively, the scanner can be a contact image sensor (CIS) system including an image capturing sensor such as a complementary metal-oxide-semiconductor (CMOS) image sensor or the like. Alternatively, the scanner is any other well-known scanning or image capturing system.

The control panel 15 includes a button, a touch panel, and the like for a user of the image forming apparatus 1 to perform an input operation. For example, the touch panel is formed by stacking a display such as a liquid crystal display or an organic EL display and a pointing device by a touch input. Therefore, the button and the touch panel function as an input device that receives an input operation from the user of the image forming apparatus 1. The display provided on the touch panel functions as a display device for notifying the user of various information about the operations or states of the image forming apparatus 1.

Figure 2:
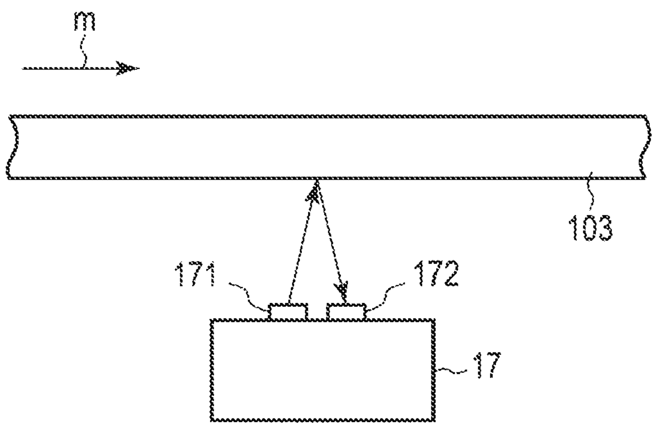
FIG. 2 is a schematic configuration diagram illustrating an example of a sensor.

FIG. 2 is a schematic configuration diagram of a sensor 17 according to the first embodiment.

The sensor 17 is disposed at a location facing a surface of the transfer belt 103 to which the toner adheres. The sensor 17 includes a light emitting element 171 and a light receiving element 172. The sensor 17 receives reflected light from the surface of the transfer belt 103 with the light receiving element 172. The amount of reflected light detected by the light receiving element 172 varies depending on the amount of toner adhered to the transfer belt 103 as well as such things as the cleanliness of the light emitting element 171 and the light receiving element 172.

Figure 3:
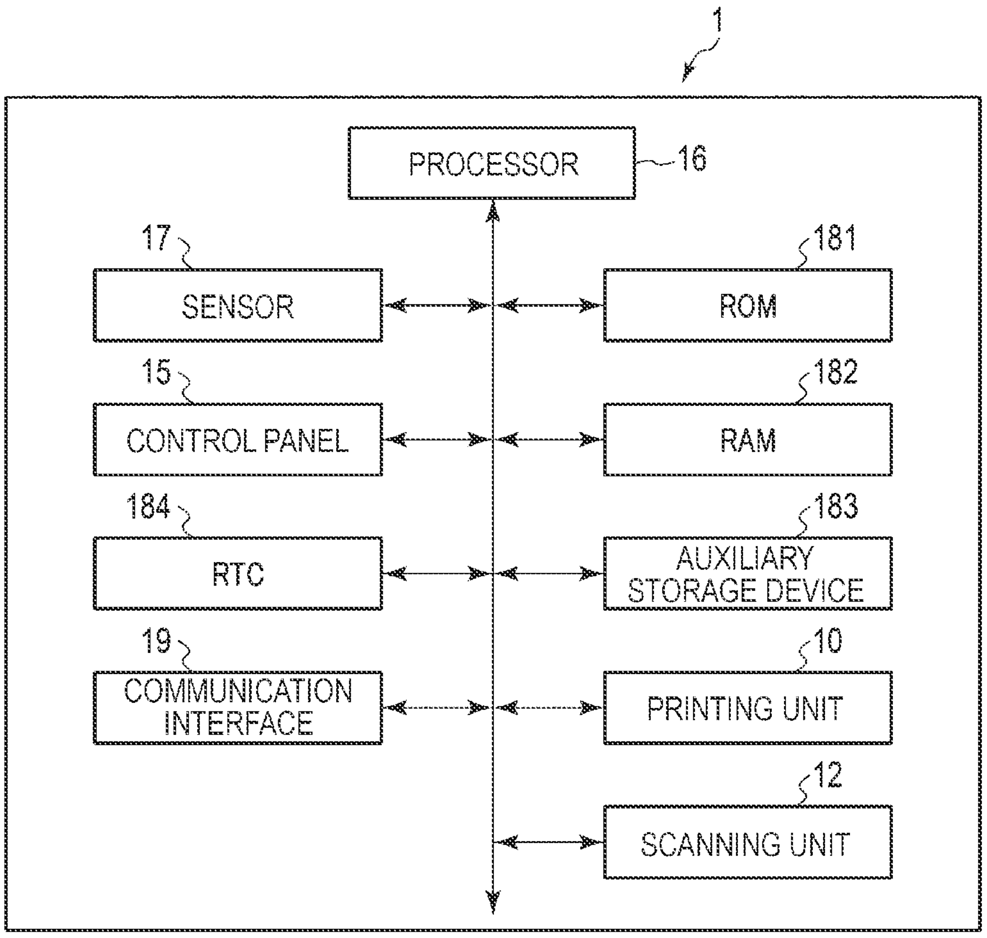
FIG. 3 is a block diagram illustrating an example of a circuit configuration.

An example configuration of the image forming apparatus 1 will be described with reference to FIG. 3. FIG. 3 is a block diagram of the image forming apparatus 1 according to the first embodiment.

The image forming apparatus 1 includes a processor 16, a read-only memory (ROM) 181, a random-access memory (RAM) 182, an auxiliary storage device 183, a real-time clock (RTC) 184, a communication interface 19, a printing unit 10, a scanning unit 12, a control panel 15, a sensor 17.

The processor 16 performs processes such as calculation, control, and the like necessary for the operation of the image forming apparatus 1. The processor 16 controls each subunit of the image forming apparatus 1 to implement various functions of the image forming apparatus 1. The processor 16 performs its control functions based on a program such as system software, an operating system, application software, firmware, or the like stored in the ROM 181 or the auxiliary storage device 183 or otherwise. The processor 16 is, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD), a field-programmable gate array (FPGA), or the like. Alternatively, the processor 16 is a combination of these circuits, units, processors, or the like.

The ROM 181 is a non-volatile computer-readable storage medium. The ROM 181 permits only the reading of data stored therein and is generally not rewritable. The ROM 181 stores data, various parameters values, and the like used by the processor 16 to perform various processes.

The RAM 182 is memory used for temporary storage of data, which can be read and written as necessary. The RAM 182 acts a work area of the processor 16 in the performance of various processes.

The auxiliary storage device 183 is, for example, an electric erasable programmable read-only memory (EEPROM®), a hard disk drive (HDD), a solid-state drive (SSD), or the like. The auxiliary storage device 183 stores data used by the processor 16 to perform various processes, data generated by the process of the processor 16, various parameter values, and the like.

For example, the auxiliary storage device 183 stores the number of printed sheets of the image forming medium P, a threshold value TA for determining execution of a light amount correction, a target value TB, and a threshold value TC. The number of printed sheets is tracked based on the detection signals corresponding to an image forming medium P being output from the printing unit 10. The tracked number of printed sheets may be the total number of printed sheets from the initial use of the image forming apparatus 1 to the present, or may be the total number of printed sheets over a certain period of time such as from after reception of a count reset instruction to the present. The threshold value TA corresponds to a number of printed sheets. The threshold value TA may be referenced to a cumulative driving time or elapsed operation time, or may be a combination of the number of printed sheets and the cumulative driving time. The target value TB is referenced to a reflected light amount. The threshold value TC is a light amount adjustment value. The threshold value TC can be set in advance by a designer, a seller, a serviceman, a user, or the like of the image forming apparatus 1. The threshold value TC may be set by the processor 16 according to a usage state or the like of the image forming apparatus 1.

The auxiliary storage device 183 stores a light amount adjustment value C indicating a light amount as adjusted by the processor 16. This light amount adjustment value C is adjusted according to a detected reflected light amount to obtain a target reflected light amount at the light receiving element 172.

The auxiliary storage device 183 stores information output in an information output process. The output information is (user) guidance information, and the guidance information can be image data, audio data, or a combination thereof. For example, the guidance information can be warning information related to the sensor 17, and the warning information includes information for urging the cleaning of the sensor 17.

Instead of the auxiliary storage device 183 (or in addition to the auxiliary storage device 183), the image forming apparatus 1 may include an interface into which a storage medium such as a removable optical disk, a memory card, a universal serial bus (USB) memory, or the like can be inserted.

As an example, the image forming apparatus 1 can be transferred to an administrator with the required program(s) stored in the ROM 181 or the auxiliary storage device 183. Alternatively, the image forming apparatus 1 may be transferred to the administrator with the required program(s) not yet stored in the ROM 181 or the auxiliary storage device 183. A required program(s) may be separately transferred to the administrator or the like, and may then be written to the ROM 181 or the auxiliary storage device 183 under direction of the administrator, a serviceman, or the like. The required program(s) may be provided on a removable storage medium such as a magnetic disk, a magneto-optical disk, an optical disk, a semiconductor memory, and the like, or by downloading of the program(s) via a network or the like.

The communication interface 19 is an interface for allowing the image forming apparatus 1 to communicate with a server 2 via a network or the like.

The RTC 184 is a clock or a circuit having a built-in clock function.

Figure 4:
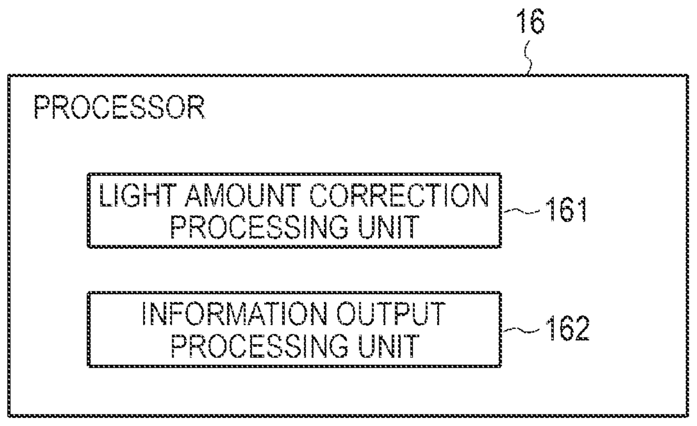
FIG. 4 is a block diagram illustrating an example of a processor configuration.

FIG. 4 is a block diagram illustrating an example of the configuration of the processor 16 of the image forming apparatus 1 according to the first embodiment.

The processor 16 includes a light amount correction processing unit 161 and an information output processing unit 162. The processor 16 implements functions of the light amount correction processing unit 161 and the information output processing unit 162 by executing a program stored in the ROM 181 or the auxiliary storage device 183. In other examples, the light amount correction processing unit 161 and the information output processing unit 162 may be implemented by hardware such as large scale integration (LSI) circuits, an application specific integrated circuit (ASIC), a field-programmable gate array (FPGA), or the like providing the same function as that of the processor 16 executing a program.

The light amount correction processing unit 161 executes a light amount correction process at a predetermined timing. For example, the light amount correction processing unit 161 receives an instruction for the execution of a light amount correction based on a comparison result of the threshold value TA stored in the auxiliary storage device 183 and the number of printed sheets for a certain period and a comparison result of the target value TB and the detected reflected light amount.

The information output processing unit 162 executes an information output process. After executing the light amount correction process, the information output processing unit 162 acquires the light amount adjustment value C stored in the memory. The information output processing unit 162 compares the threshold value TC with the light amount adjustment value C, determines an information output based on the comparison result, and sends an instruction for outputting the information.

Figure 5:
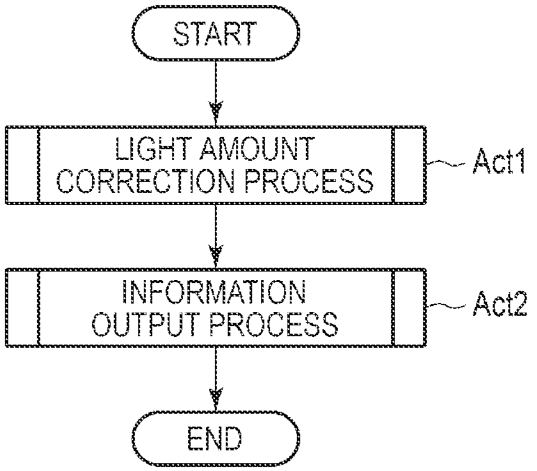
FIG. 5 is a flowchart illustrating an example of an overall operation of an image forming apparatus.

An operation of the image forming apparatus 1 according to the first embodiment will be described with reference to FIGS. 5, 6, and 7. The content of the process in the following description is only an example, and various processes capable of obtaining substantially the same effect may be substituted for those of the example. FIG. 5 is a flowchart illustrating an example of an overall operation by the image forming apparatus according to the first embodiment. The processor 16 executes this process based on a program stored in the ROM 181 or the auxiliary storage device 183.

For example, the image forming apparatus 1 starts the process illustrated in FIG. 5 after returning from an off state, a sleep state or a standby state before performing printing on an image forming medium P.

In Act 1, the processor 16 (more particularly, the light amount correction processing unit 161) executes a light amount correction process. For example, the processor 16 provides an instruction for execution of a light amount correction, based on a comparison of the threshold value TA to the number of printed sheets over a certain period, and a comparison of the target value TB to the detected reflected light amount.

The processor 16 causes the sensor 17 to emit light from the light emitting element 171 at a light intensity corresponding to a reference value. The sensor 17 then receives reflected light from the transfer belt 103 at the light receiving element 172, and then outputs a detection signal corresponding to the reflected light amount received at the light receiving element 172.

The processor 16 determines the reflected light amount based on the detection signal from the sensor 17, and then adjusts the light amount output from the light emitting element 171 so that the reflected light amount is within a target range. The processor 16 stores a light amount adjustment value C indicating the adjusted light amount in a memory. The adjustment of the light amount in this context may be regarded as the correction or control of the light amount.

In Act 2, the processor 16 (more specifically, the information output processing unit 162) executes an information output process. After executing the light amount correction process, the processor 16 acquires the light amount adjustment value C stored in the memory. The processor 16 compares the threshold value TC to the light amount adjustment value C, determines whether to output information or not based on the comparison result.

Figure 6:
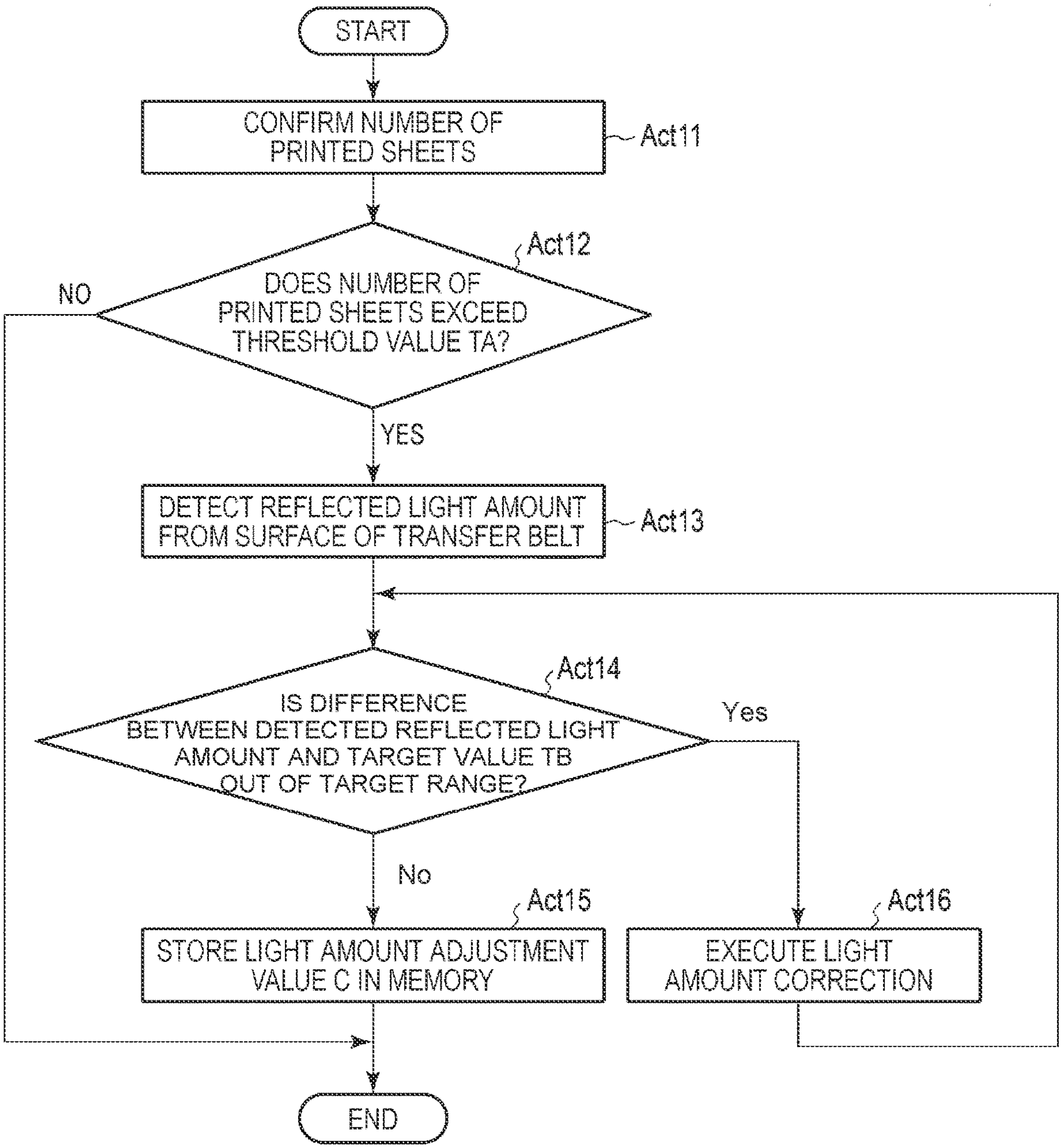
FIG. 6 is a flowchart illustrating an example of a light amount correction processing operation.

FIG. 6 is a flowchart illustrating an example of a light amount correction processing operation by the image forming apparatus 1 according to the first embodiment. That is, FIG. 6 is a flowchart illustrating details of the light amount correction process of Act 1.

The processor 16 executes the light amount correction process at some predetermined timing. The processor 16 reads out the threshold value TA stored in the auxiliary storage device 183 and the number of printed sheets over a certain period, compares the threshold value TA to the number of printed sheets, and confirms whether or not the number of printed sheets over a certain period exceeds the threshold value TA (Act 11). Here, the threshold value TA is a number of printed sheets. While the example embodiment concerns a case in which threshold value TA is equal to 1,000 sheets, any number of printed sheets may be set as the threshold value TA.

If the processor 16 determines that the number of printed sheets for a certain period is equal to or less than the threshold value TA (Act 12, NO), the processor 16 ends the light amount correction processing operation without executing light amount detection for the light amount correction process.

If the processor 16 determines that the number of printed sheets exceeds the threshold value TA (Act 12, YES), the processor 16 provides an instruction for the execution of the light amount correction. The sensor 17 emits light from the light emitting element 171 based on the instruction from the processor 16, receives reflected light with the light receiving element 172, and detects a reflected light amount from a belt surface of the transfer belt 103 (Act 13).

The sensor 17 detects the reflected light amount received at the light receiving element 172. The processor 16 determines whether or not the light amount correction is to be executed based on the target value TB and the detected reflected light amount. If the processor 16 determines that a difference between the detected reflected light amount and the target value TB is within the target range (Act 14, NO), the processor 16 causes the present light adjustment amount value C to be stored in memory (Act 15). However, if the difference between the detected reflected light amount and the target value TB is out of the target range (Act 14, YES), the processor 16 executes the light amount correction (ACT 16). The processor 16 increases or decreases the light amount emitted from the light emitting element 171 by some amount as the light amount correction. Once the difference between the detected reflected light amount and the target value TB is within the target range, the presently set amount of light emitted from the light emitting element 171 becomes the light amount adjustment value C and is stored in memory (Act 15). The processor 16 may store the last amount of light emitted from the light emitting element 171 as the light adjustment amount value C in the memory if the difference between the detected reflected light amount and the target value TB is still out of the target range even the processor 16 tries to execute the light amount correction a predetermined number of times.

The light amount adjustment value C is not limited thereto, and may be, for example, a change amount reflecting a change from a reference light amount. If the processor 16 determines that the difference between the detected reflected light amount and the target value TB is within the target range (Act 14, YES), the processor 16 stores the current light amount adjustment value in the memory (Act 15). The processor 16 outputs a count reset, and sets the number of printed sheets for a certain period stored in the memory to 0.

As described above, the processor 16 adjusts the light amount adjustment value by the operations in Act 14 and Act 16 so that the detected reflected light amount will be within an appropriate range.

Figure 7:
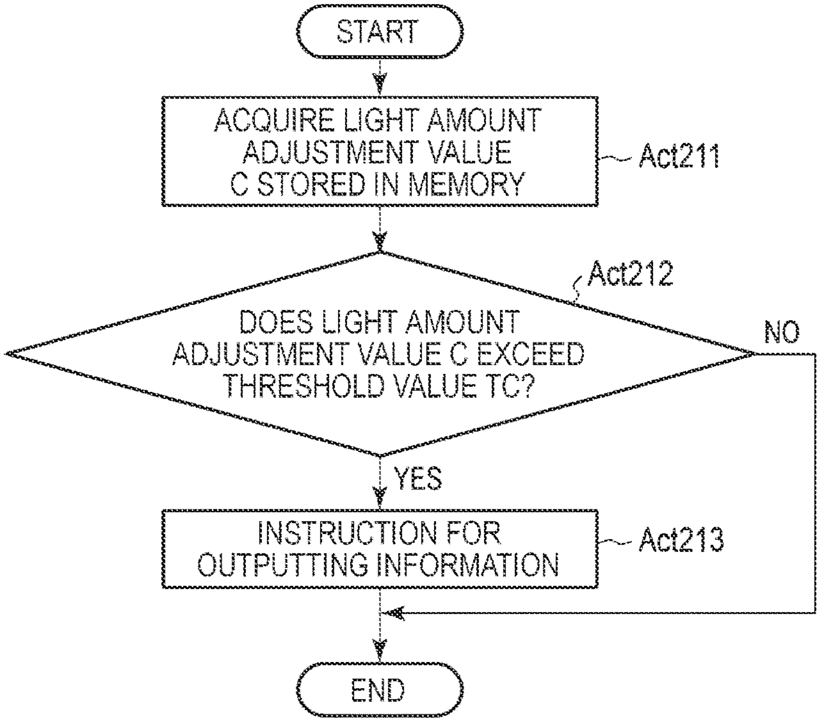
FIG. 7 is a flowchart illustrating an example of an information output processing operation by an image forming apparatus according to a first embodiment.

FIG. 7 is a flowchart illustrating an example of an information output processing operation by the image forming apparatus 1 according to the first embodiment. That is, FIG. 7 is a flowchart illustrating details of the information output process of Act 2 illustrated in FIG. 5.

The processor 16 acquires the light amount adjustment value C stored in the memory in Act 15 (Act 211). The processor 16 determines whether or not to output information based on a comparison of the threshold value TC to the acquired light amount adjustment value C. The processor 16 then checks whether or not the light amount adjustment value C exceeds the threshold value TC (Act 212).

If the light amount adjustment value C exceeds the threshold value TC (Act 212, YES), the processor 16 provides an instruction for outputting information (Act 213). For example, the control panel 15 outputs warning information as an image or a voice (or sound).

The method for outputting such information is not limited to the control panel 15, and any device that can provide information to a user may be used. For example, the communication interface 19 outputs (transmits) information to a designated communication device, and the designated communication device receives the information and provides the information to the user via a display screen or the like. The communication interface 19 may output (transmits) information to another designated image forming apparatus 1 such that the other designated image forming apparatus 1 receives the information, and the control panel 15 of the other image forming apparatus 1 provides the information to the user via a display screen or otherwise.

If the processor 16 determines that the light amount adjustment value C is equal to or less than the threshold value TC (Act 212, NO), the processor 16 ends the information output process.

Figure 8:
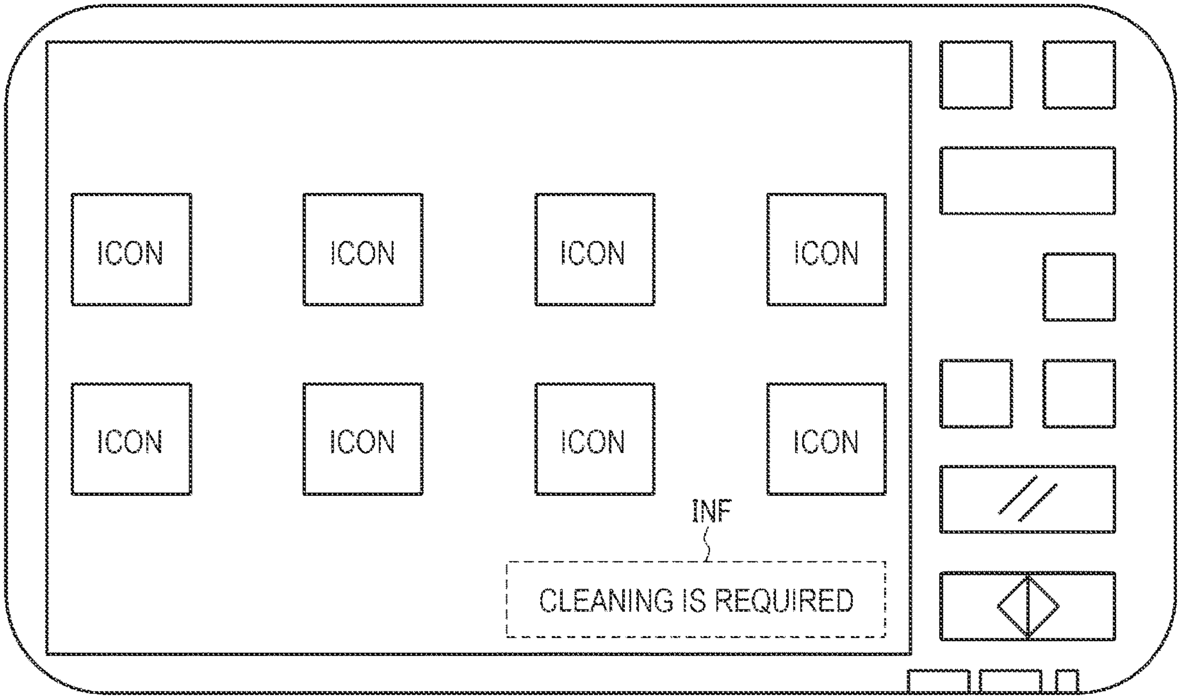
FIG. 8 is a schematic view illustrating an example of an information display.

FIG. 8 is a diagram illustrating an example of information display by the image forming apparatus 1 according to the first embodiment. The processor 16 outputs warning information INF related to the sensor 17 as information to be displayed on the control panel 15 serving as a user interface. For example, the warning information INF includes information that urges cleaning of the sensor 17. The control panel 15 displays the warning information INF at a predetermined location on the touch panel. The warning information INF may include, for example, a warning text as illustrated in FIG. 8, or may include serviceman's contact information or the like.

The control panel 15 may generally display the warning information INF at a location different from a display location of an icon so as not to impair operability of various functions via the icons corresponding to various functions. Alternatively, to emphasize the warning, the control panel 15 may display the warning information INF overlapping with the display location of one or more icons to limit the possible selection of the icon(s) by the user.

Until the cleaning of the sensor 17 is completed and the processor 16 determines that the detected reflected light amount of the sensor 17 (or the light amount adjustment value C) is in the acceptable range, the processor 16 continuously outputs the warning information INF. The control panel 15 stops the output of the warning information INF based on an instruction from the processor 16 for stopping the output of the warning information INF. For example, if the warning information INF is an image, the image is turned off, and if the warning information INF is a voice, an output of the voice is stopped.

Figure 9:
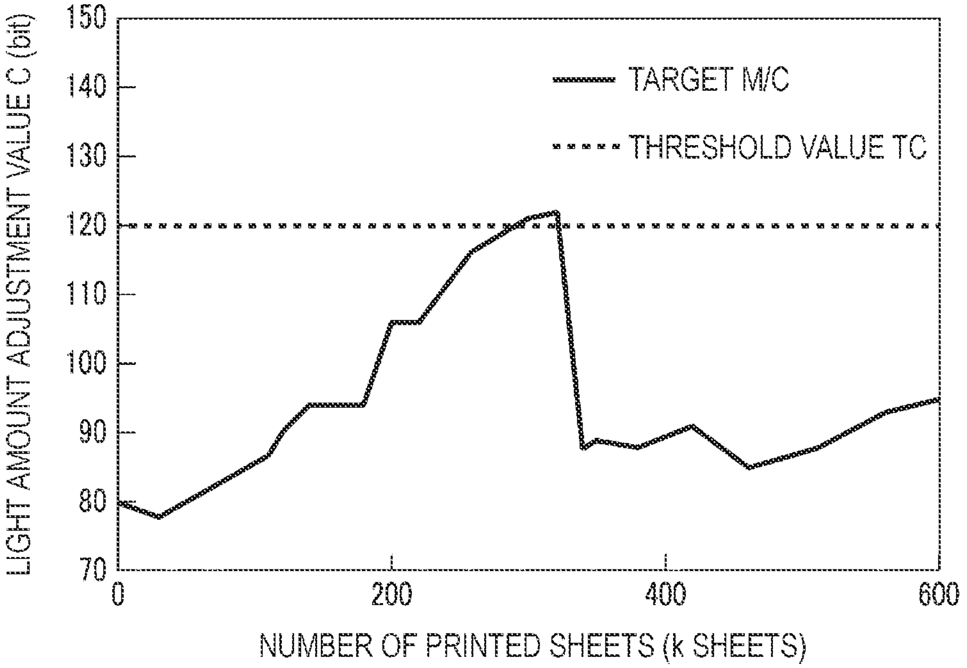
FIG. 9 is a diagram illustrating an example of a change in a light amount adjustment value and a threshold value according to a first embodiment.

FIG. 9 is a diagram illustrating an example of changes in the light amount adjustment value C relative to a threshold value (TC) according to the first embodiment. For example, as illustrated in FIG. 9, the light amount adjustment value C of a target M/C (that is, the image forming apparatus 1) generally increases as the number of printed sheets increases, and may eventually exceed the threshold value TC. However, once the light amount adjustment value C exceeds the threshold value TC, the processor 16 provides an instruction for outputting warning information urging cleaning. The control panel 15 and the like output warning information accordingly. Thus, a serviceman or the like cleans the sensor 17. As a result, the sensor 17 can accurately detect a toner adhesion amount.

By being able to accurately detect the toner adhesion amount, the toner density can be appropriately set, image defects can be reduced, and deterioration in print quality can be prevented. Cleaning of the sensor 17 at the appropriate timing enables a user to reduce the long-term cost of the image forming apparatus 1, and the burden on a serviceman can be reduced.

Second Embodiment

The basic configurations of the image forming apparatus 1 and the sensor 17 of a second embodiment are the same as those of the image forming apparatus 1 and the sensor 17 of the first embodiment. The auxiliary storage device 183 of the second embodiment further stores a threshold value TC12 (a first threshold value) and a threshold value TC11 (a second threshold value). The threshold values TC11 and TC12 indicate light amount adjustment values, and the threshold value TC11 is smaller than the threshold value TC12. The threshold values TC11 and TC12 are set in advance by a designer, a seller, a serviceman, a user, or the like of the image forming apparatus 1. In some examples, the threshold values TC11 and TC12 may be set or adjusted by the processor 16 based on a usage state or the like of the image forming apparatus 1.

The overall operation by the image forming apparatus 1 according to the second embodiment and a light amount correction processing operation by the image forming apparatus 1 according to the second embodiment are the same as the overall operation and the light amount correction processing operation illustrated in FIGS. 5 and 6 of the first embodiment.

Hereinafter, an information output processing operation of the image forming apparatus 1 according to the second embodiment will be described with reference to FIG. 10.

Figure 10:
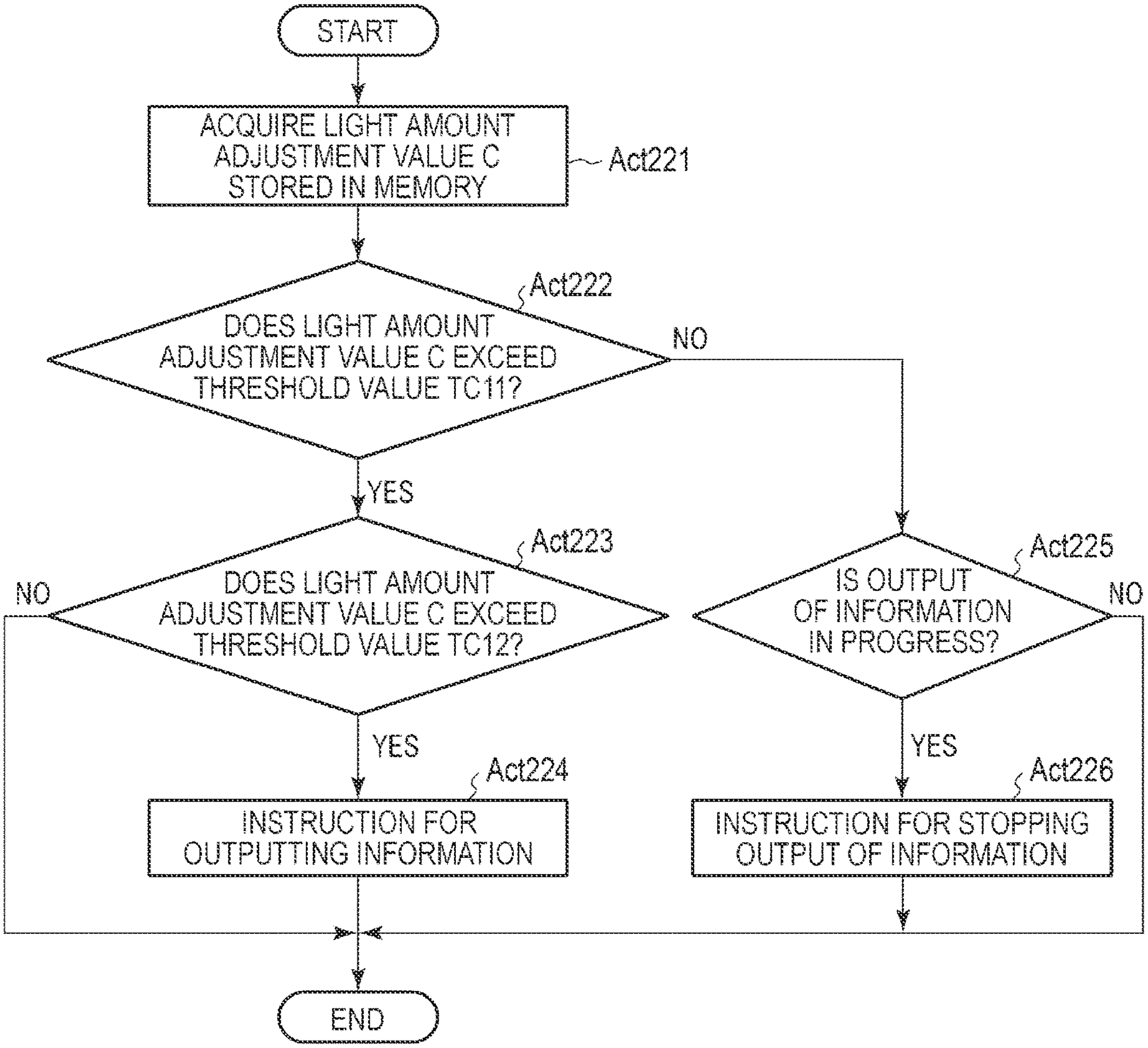
FIG. 10 is a flowchart illustrating an example of an information output processing operation by an image forming apparatus according to a second embodiment.

FIG. 10 is a flowchart illustrating an example of the information output processing operation by the image forming apparatus 1 according to the second embodiment. That is, FIG. 10 is a flowchart illustrating details of the information output process of Act 2.

The processor 16 (more specifically, the information output processing unit 162) acquires the light amount adjustment value C stored in the memory (Act 221). The processor 16 compares the threshold value TC12 with the light amount adjustment value C, and, based on the comparison, provides an instruction or not for outputting information. The processor 16 also compares the threshold value TC11 with the light amount adjustment value C, and, based on the comparison, provides an instruction or not for stopping the output of the information.

When the light amount adjustment value C exceeds the threshold value TC11 (Act 222, YES) and the light amount adjustment value C also exceeds the threshold value TC12 (Act 223, YES), the processor 16 provides the instruction for outputting the information (Act 224). For example, the control panel 15 outputs warning information as an image or a voice. The method for outputting the information can be the same as that of the first embodiment. When determining that the light amount adjustment value C is equal to or less than the threshold value TC12 (Act 223, NO), the processor 16 ends the information output processing operation if presently on-going.

For example, after the warning information is output, if the processor 16 subsequently acquires a light amount adjustment value C stored in the memory (Act 221) and this light amount adjustment value C is equal to or less than the threshold value TC11 (Act 222, NO), the processor 16 provides the instruction for stopping the output of the information if the information is being output (Act 225, YES). If the warning information is not being output (Act 225, NO), the processor 16 ends the information output processing operation.

According to the second embodiment, in addition to the effects of the first embodiment, the following effects can be obtained. The processor 16 acquires the light amount adjustment value C at a predetermined timing after providing the instruction for outputting the warning information, compares the threshold value TC11 with the light amount adjustment value C, and monitors a decrease in the light amount adjustment value C based on a comparison result. Thus, if the sensor 17 is cleaned and the processor 16 detects that the light amount adjustment value C is now equal to or less than the threshold value TC11 through the light amount correction process, the processor 16 stops any output of warning information in progress. Therefore, it is not required for a user or a serviceman to manually stop or clear a warning display after the processor 16 outputs a warning or the like urging the cleaning once.

Furthermore, by applying the two threshold values TC11 and TC12 and appropriately adjusting the two threshold values TC11 and TC12, even though the light amount adjustment value C is unstable and fluctuates slightly, it is possible to prevent the frequent switching between output and stopping of the warning information output.

Third Embodiment

Basic configurations of the image forming apparatus 1 and the sensor 17 of a third embodiment are the same as those of the image forming apparatus 1 and the sensor 17 of the first embodiment.

Figure 11:
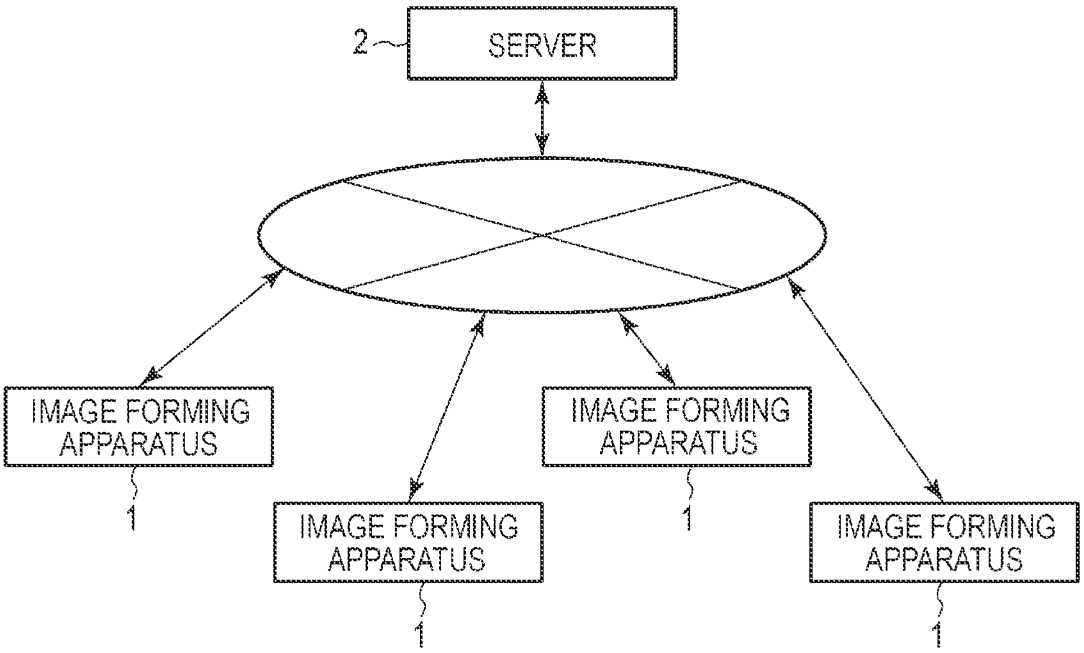
FIG. 11 is a schematic configuration diagram of a mutual communication system according to certain embodiments.

FIG. 11 is a schematic configuration diagram of a mutual communication system according to the third embodiment.

The mutual communication system includes a plurality of image forming apparatuses 1 and a server 2. Each image forming apparatus 1 is communicably connected to the other image forming apparatuses 1 and the server 2 via a network. In FIG. 11, four image forming apparatuses 1 are illustrated, and the number of image forming apparatuses 1 is not limited thereto.

Figure 12:
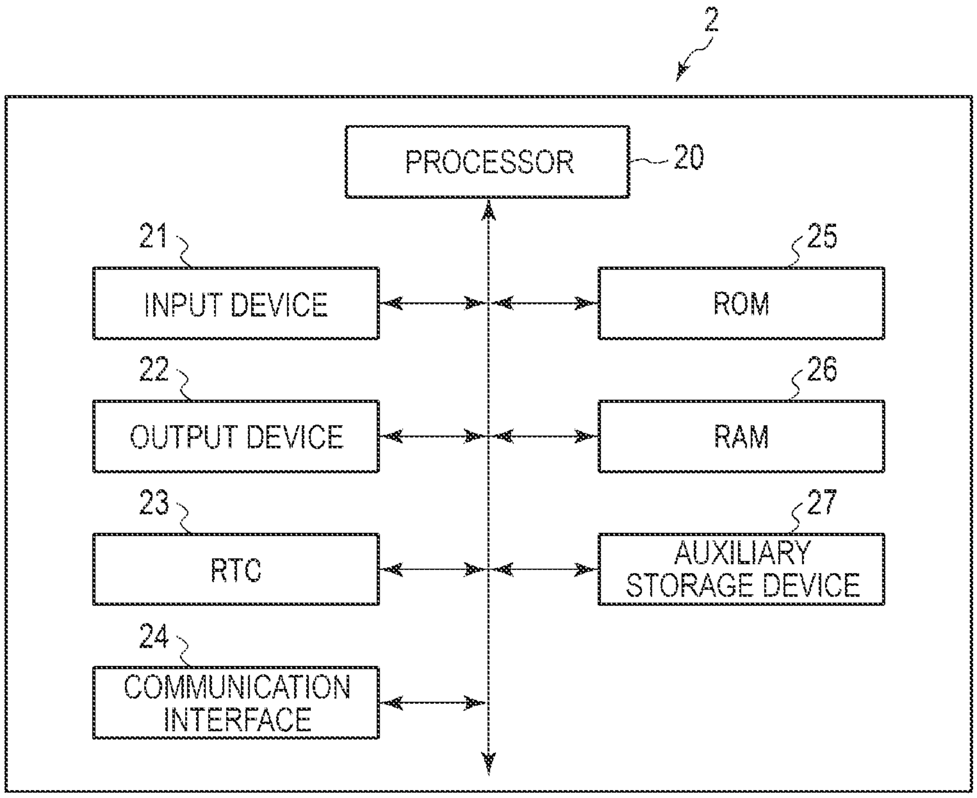
FIG. 12 is a block diagram of a server.

FIG. 12 is a block diagram illustrating the example of the configuration of the server 2 according to the third embodiment.

The server 2 includes a processor 20, a read-only memory (ROM) 25, a random-access memory (RAM) 26, an auxiliary storage device 27, a real-time clock (RTC) 23, a communication interface 24, an input device 21, and an output device 22.

The processor 20 performs processes such as calculation and control necessary for operation of the server 2. The processor 20 controls each sub-unit to implement various described functions of the server, based on a program such as system software, application software, or firmware stored in the ROM 25, the auxiliary storage device 27, or the like. The processor 20 is, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD), a field-programmable gate array (FPGA), or the like. Alternatively, the processor 20 is a combination of a plurality such elements.

The ROM 25 is a non-volatile memory from which data can be read, but not written in normal operation. The ROM 25 stores data or various parameter values used by the processor 20 to perform various processes.

The RAM 26 is a memory used for reading and writing data. The RAM 26 temporarily stores data as the processor 20 performs various processes, and is used as a so-called work area of the processor 20.

The auxiliary storage device 27 is, for example, an electric erasable programmable read-only memory (EEPROM®), a hard disk drive (HDD), a solid-state drive (SSD), and the like. The auxiliary storage device 27 stores data used by the processor 20 to perform various processes, data generated by the process of the processor 20, various parameters values, and the like. Instead of the auxiliary storage device 27, or in addition to the auxiliary storage device 27, the server 2 may include an interface into which a storage medium such as a removable optical disk, a memory card, a universal serial bus (USB) memory, or the like can be inserted. The auxiliary storage device 27 is a memory used for storing various information, and stores, in this example, the threshold value TC.

The server 2 can be transferred to an administrator or the like with the required program(s) stored in the ROM 25 or the auxiliary storage device 27. Alternatively, program(s) may be separately transferred to the administrator or the like, then written to the ROM 25 or the auxiliary storage device 27. The transfer of the program(s) can be implemented by recording the program on a removable storage medium such as a magnetic disk, a magneto-optical disk, an optical disk, a semiconductor memory, and the like, or by downloading the program(s) via a network and the like.

The communication interface 24 is an interface for the server 2 to communicate with the image forming apparatuses 1 via a network.

The RTC 23 is a clock or a circuit having a built-in clock function.

The input device 21 is, for example, a device that recognizes character data input by an administrator who manages the server 2 by using a device that receives voice data such as a microphone or the like, or an input detection sheet that adopts an electrostatic system or a pressure system.

The output device 22 is a display device using, for example, a liquid crystal display, an organic EL, and the like. The output device 22 displays a voice, a character, an image, and the like corresponding to a signal input from the input device 21.

The basic part of an overall operation by the image forming apparatuses 1 according to the third embodiment and a light amount correction processing operation by the image forming apparatuses 1 according to the third embodiment are the same as that of the overall operation and the light amount correction processing operation of the first embodiment.

Figure 13:
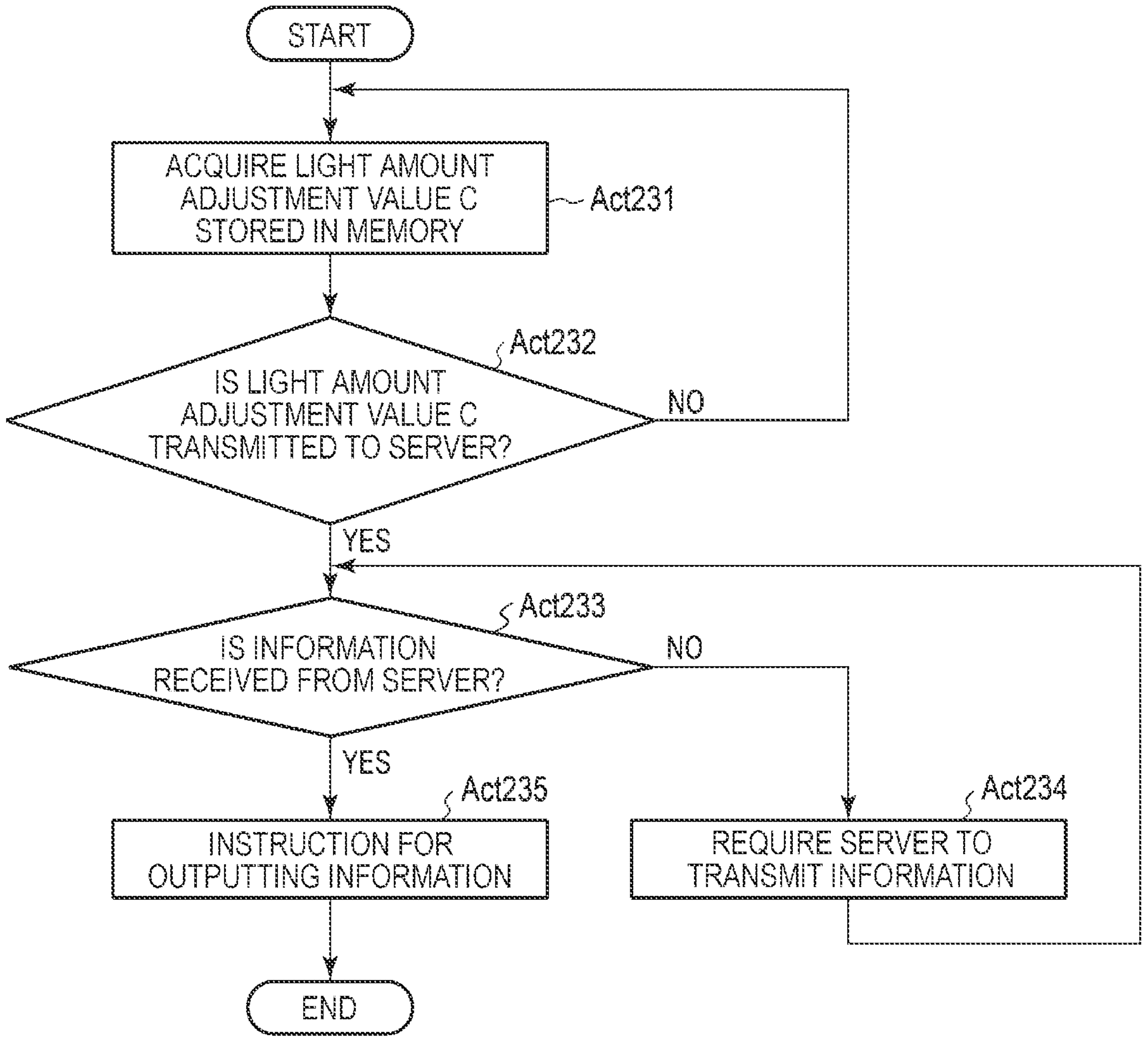
FIG. 13 is a flowchart illustrating an example of an information output processing operation by an image forming apparatus according to a third embodiment.

FIG. 13 is a flowchart illustrating an example of the information output processing operation by an image forming apparatus 1 according to the third embodiment. That is, FIG. 13 is a flowchart illustrating details of the information output process of Act 2.

The processor 16 acquires the light amount adjustment value C stored in the memory (Act 231). The communication interface 19 transmits the acquired light amount adjustment value C to the server 2 (Act 232). If the communication interface 19 can transmit the light amount adjustment value C to the server 2 (Act 232, YES), the communication interface 19 waits for the reception of information from the server 2. The information transmitted to the server 2 is, for example, identification information of the image forming apparatus 1, the light amount adjustment value C, and the number of printed sheets correlated with the light amount adjustment value C, but is not limited thereto. For example, the information may include a driving time correlated with the light amount adjustment value C, a previous light amount adjustment value C, a threshold value set by the image forming apparatus 1, and the like.

The frequency at which the image forming apparatus 1 transmits the information to the server 2 via the communication interface 19 can be whenever the light amount adjustment value C changes. A serviceman can also acquire the information at any timing through the server 2, thereby making it possible to specify a date and perform setting to transmit the information a predetermined number of times a day.

The communication interface 24 of the server 2 receives the light amount adjustment value C and the like transmitted from the communication interface 19 of an image forming apparatus 1. The server 2 stores the received light amount adjustment value C and the like in a memory. The memory is, for example, the auxiliary storage device 27.

The processor 20 acquires the light amount adjustment value C from the memory. The processor 20 analyzes the light amount adjustment value C corresponding to the number of printed sheets and outputs an analysis result. For example, the communication interface 24 transmits the analysis result to a communication terminal owned by the serviceman. The communication terminal receives and outputs the analysis result. The serviceman can confirm the analysis result via the communication terminal and decide to perform the cleaning of the sensor 17 as necessary.

The processor 20 compares the threshold value TC with the acquired light amount adjustment value C, and provides an instruction for outputting information based on a comparison result. When determining that the light amount adjustment value C exceeds the threshold value TC1, the processor 20 provides an instruction for outputting warning information indicating that cleaning is required. When determining that the light amount adjustment value C exceeds the threshold value TC1, the processor 20 may input an instruction for outputting information indicating that the light amount adjustment value C exceeds the threshold value TC1. The communication interface 24 transmits the warning information and the like corresponding to the light amount adjustment value C to the image forming apparatus 1.

If the communication interface 16 receives the information transmitted from the server 2, the processor 16 releases a standby state (Act 233, YES). The processor 16 periodically requests the server 2 to transmit the information during the standby state (Act 234). The request for transmitting the information may be executed if the communication interface 19 fails to receive the information, or may be executed if the communication interface 24 fails to transmit the information.

The processor 16 provides an instruction for outputting the received information (Act 235). For example, the control panel 15 outputs the warning information as an image or a voice.

The processor 16 outputs the information based on the information transmitted from the server 2. After that, when receiving the information from the server 2 indicating that the light amount adjustment value C is equal to or less than the threshold value TC or cleaning is not required, the processor 16 provides an instruction for stopping the output of the information. Accordingly, the control panel 15 stops the output of the information in progress.

According to the third embodiment, in addition to the effects of the first and second embodiments, the following effects can be obtained. By transmitting the light amount adjustment value C, the image forming apparatus 1 can receive the information corresponding to the light amount adjustment value C and output the received information. Since the server 2 compares the threshold value TC with the light amount adjustment value C and determines the output of the information corresponding to the light amount adjustment value C, a burden on the image forming apparatus 1 is reduced. If the server 2 manages the threshold value TC, the threshold value TC can be flexibly changed, and information can be provided in a timely manner.

The server 2 collectively manages the light amount adjustment value C and the like transmitted from the image forming apparatus 1, such that various defects can be estimated by referring to past data of the same apparatus or past data of the same model. Since the server 2 manages the information, information loading to the serviceman becomes speedy.

Fourth Embodiment

Basic configurations of the image forming apparatus 1, the sensor 17, and the server 2 of a fourth embodiment are the same as those of the image forming apparatus 1, the sensor 17, and the server 2 illustrated in FIGS. 1, 2, 3, 11, and 12 of the first and third embodiment. The auxiliary storage device 183 of the fourth embodiment further stores threshold values TC21 (a first threshold value) and TC22 (a second threshold value). The threshold values TC21 and TC22 indicate light amount adjustment values, and the threshold value TC22 is greater than threshold value TC21. The threshold values TC21 and TC22 are set in advance by a designer, a seller, a serviceman, a user, and the like of the image forming apparatus 1. The threshold values TC21 and TC22 may be set in advance by the processor 16 depending on a usage state and the like of the image forming apparatus 1.

The overall operation by the image forming apparatus 1 according to the fourth embodiment and a light amount correction processing operation by the image forming apparatus 1 according to the fourth embodiment are the same as the overall operation and the light amount correction processing operation illustrated in FIGS. 5 and 6 of the first embodiment.

Hereinafter, an information output processing operation of the image forming apparatus 1 according to the fourth embodiment will be described with reference to FIG. 14.

Figure 14:
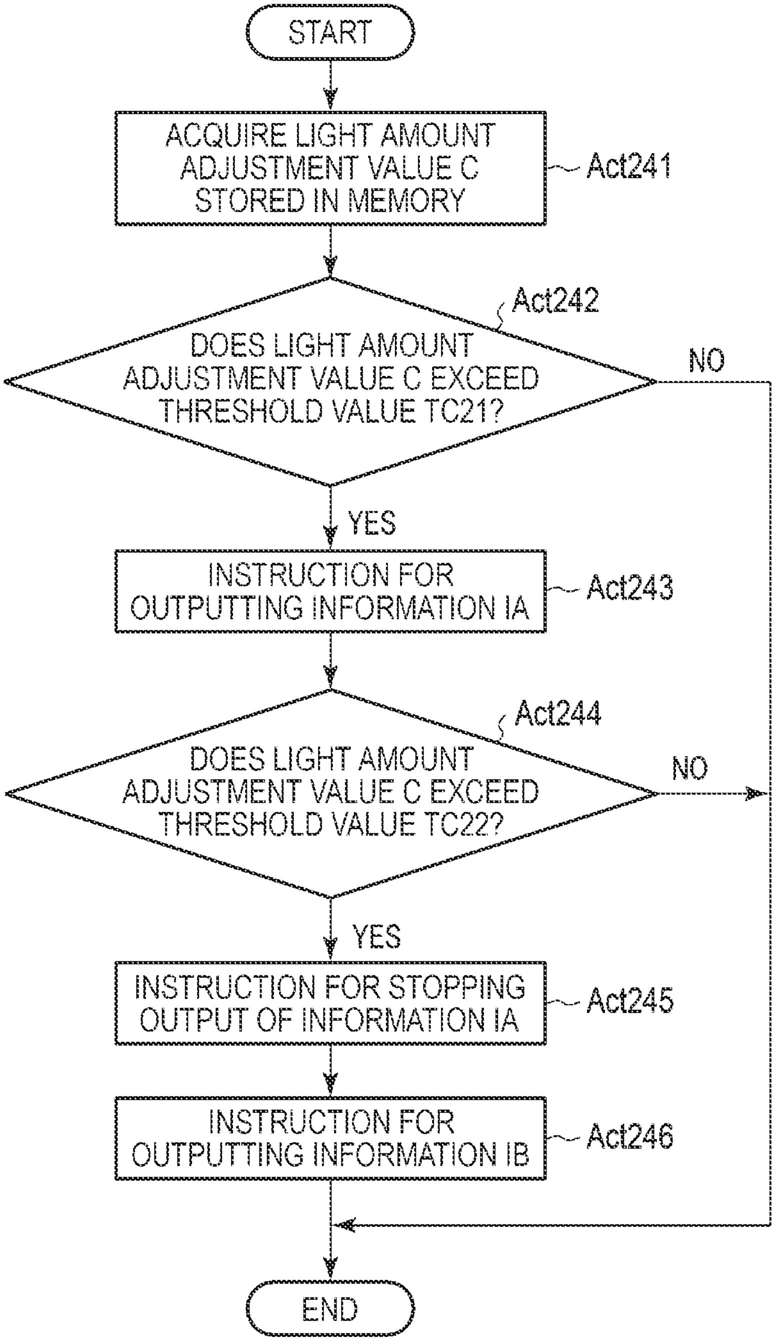
FIG. 14 is a flowchart illustrating an example of an information output processing operation by an image forming apparatus according to a fourth embodiment.

FIG. 14 is a flowchart illustrating an example of the information output processing operation by the image forming apparatus 1 according to the fourth embodiment. That is, FIG. 14 is a flowchart illustrating details of the information output process of Act 2 illustrated in FIG. 5.

The processor 16 (the information output processing unit 162) acquires the light amount adjustment value C stored in the memory (Act 241). The processor 16 compares the threshold value TC21 with the light amount adjustment value C, and provides an instruction for outputting information IA or not based on a comparison result. The processor 16 compares the threshold value TC22 greater than the threshold value TC21 with the light amount adjustment value C, and provides an instruction for outputting information IB or not based on a comparison result. That is, the processor 16 provides the instruction for outputting the information IA or IB according to the comparison of the light amount adjustment value C to the two threshold values TC21 and TC22.

When determining that the light amount adjustment value C is equal to or less than the threshold value TC22 (Act 242, NO), the processor 16 ends the information output processing operation.

When determining that the light amount adjustment value C exceeds the threshold value TC21 (Act 242, YES), the processor 16 provides the instruction for outputting the information IA (Act 243). For example, the control panel 15 outputs the information IA as an image or a voice.

When the light amount adjustment value C exceeds the threshold value TC22 (Act 244, YES), the processor 16 provides an instruction for stopping the output of the information IA (Act 245), and provides the instruction for outputting the information IB (Act 246). For example, the control panel 15 outputs the information IB as an image or a voice.

The information IA corresponding to the threshold value TC21 is, for example, warning information indicating that a current state of the sensor 17 is not a stage where cleaning is required, but the sensor 17 is noticeably dirty or glossiness of the transfer belt is slightly changed. For example, the information IB corresponding to the threshold value TC22 is information indicating a stage where cleaning of the sensor 17 is required, and urging the cleaning thereof. FIG. 14 illustrates an example in which the two pieces of information IA and IB are provided, and the embodiment is not limited thereto. The auxiliary storage device 183 stores two or more threshold values, and stores information corresponding to each threshold value. The processor 16 provides an instruction for outputting information or not based on a comparison of the light amount adjustment value C to the two or more threshold values. When determining that the light amount adjustment value is equal to or less than the threshold value TC22 (Act 244, NO), the processor 16 ends the information output processing operation while still performing the output of the information IA.

According to the fourth embodiment, in addition to the effects of the first and second embodiments, the following effects can be obtained. For example, the processor 16 can detect the dirtiness of the sensor 17 of the image forming apparatus 1 and the glossiness of the transfer belt 103 step by step by applying a plurality of threshold values step by step, such that a timing required for cleaning can be adjusted. The serviceman can also periodically grasp the state of the image forming apparatus 1.

Fifth Embodiment

Basic configurations of the image forming apparatus 1, the sensor 17, and the server 2 of a fifth embodiment are the same as those of the image forming apparatus 1, the sensor 17, and the server 2 illustrated in FIGS. 1, 2, 3, 11, and 12 of the first and third embodiments. The auxiliary storage device 183 of the fifth embodiment further stores a threshold value TD and a light amount estimation value CE corresponding to each number of printed sheets. The threshold value TD is set in advance by a designer, a seller, a serviceman, a user, and the like of the image forming apparatus 1. The threshold value TD may be set in advance by the processor 16 depending on a usage state and the like of the image forming apparatus 1. The light amount estimation value CE is, for example, a value calculated from an average value or a median value of the light amount adjustment values corresponding to the number of printed sheets by referring to the data of the plurality of image forming apparatuses 1 stored in the server 2. In other words, the light amount estimation value CE is a light amount adjustment value of a model M/C (that is, the image forming apparatus 1 which becomes a model). The light amount estimation value CE may be a value transmitted from the server 2 in real time, or a value stored in the image forming apparatus 1 before shipment.

The overall operation by the image forming apparatus 1 according to the fifth embodiment and a light amount correction processing operation by the image forming apparatus 1 according to the fifth embodiment are the same as the overall operation and the light amount correction processing operation illustrated in FIGS. 5 and 6 of the first embodiment.

Hereinafter, an information output processing operation of the image forming apparatus 1 according to the fifth embodiment will be described with reference to FIG. 15.

Figure 15:
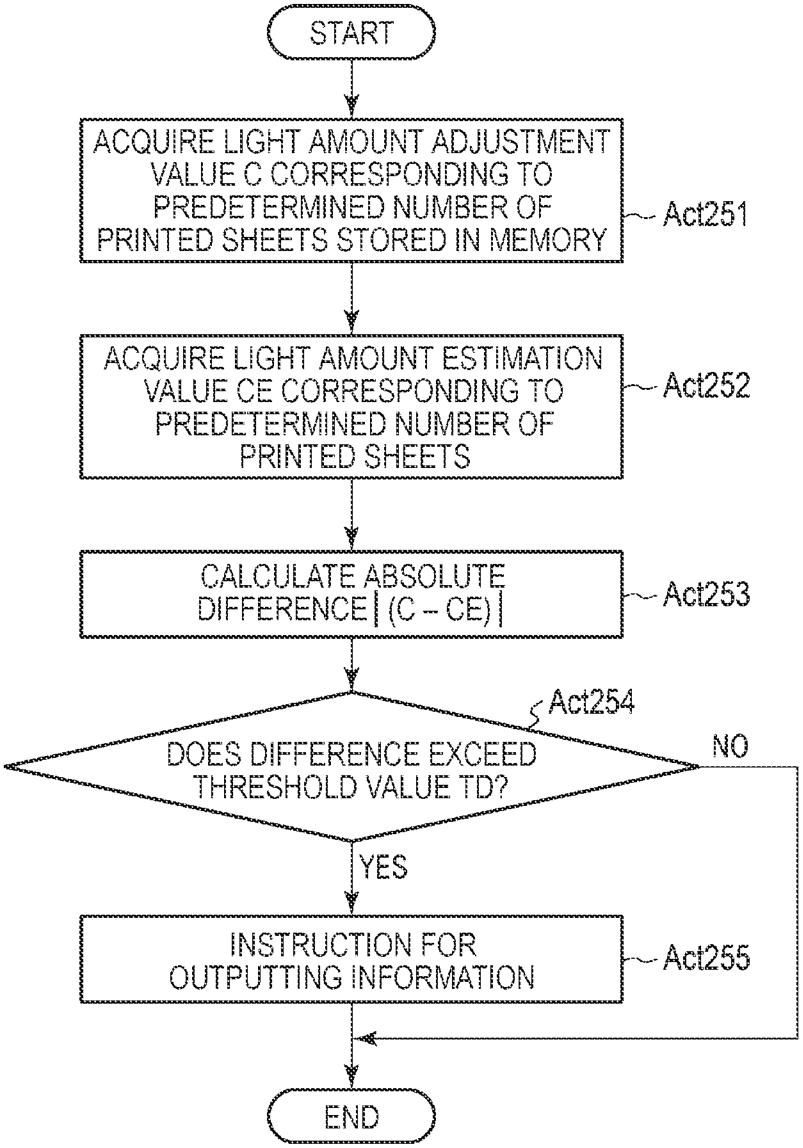
FIG. 15 is a flowchart illustrating an example of an information output processing operation by an image forming apparatus according to a fifth embodiment.

FIG. 15 is a flowchart illustrating an example of the information output processing operation by the image forming apparatus 1 according to the fifth embodiment. That is, FIG. 15 is a flowchart illustrating details of the information output process of Act 2.

The processor 16 (more particularly, the information output processing unit 162) acquires the light amount adjustment value C stored in the memory (Act 251). The acquired light amount adjustment value C is an adjustment value corresponding to a predetermined number of printed sheets. The processor 16 acquires the light amount estimation value CE stored in the memory (Act 252). The acquired light amount estimation value CE is an adjustment value corresponding to a predetermined number of printed sheets.

The processor 16 calculates an absolute difference between the acquired light amount adjustment value C and the light amount estimation value CE (Act 253). The processor 16 compares the threshold value TD with the absolute difference, and provides an instruction for outputting information or not based on a comparison result. In some examples, the processor 20 may perform the above-described process instead of the processor 16.

When the absolute difference exceeds the threshold value TD (Act 254, YES), the processor 16 provides the instruction for outputting the information (Act 255). For example, the control panel 15 outputs warning information as an image or a voice.

The processor 16 can compare the light amount adjustment value C with the light amount estimation value CE in magnitude, and then calculate the absolute difference only if the light amount adjustment value C is greater than the light amount estimation value CE. The processor 16 can also end the information output process if the light amount estimation value CE is greater than the light amount adjustment value C. In some examples, the processor 20 may perform the above-described process instead of the processor 16.

When the absolute difference is equal to or less than the threshold value TD (Act 254, NO), the processor 16 ends the information output processing operation. If the light amount adjustment value C changes and the absolute difference becomes equal to or less than the threshold value TD, the processor 16 provides an instruction for stopping the output of the information. The processor 16 outputs the information based on the information transmitted from the server 2. After that, when receiving the information from the server 2 indicating that the absolute difference is equal to or less than the threshold value TD or cleaning is not required, the processor 16 provides the instruction for stopping the output of the information. Accordingly, the control panel 15 stops the output of the warning information in progress.

Figure 16:
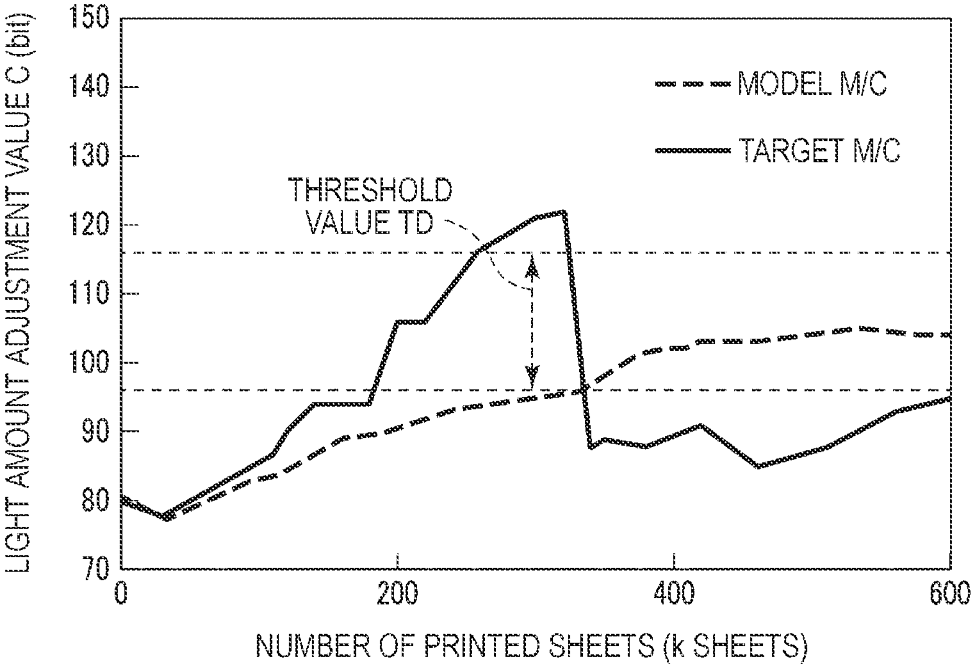
FIG. 16 is a diagram illustrating an example of a change in a light amount adjustment value and a threshold value.

FIG. 16 is a diagram illustrating an example of a change in the light amount adjustment value and a threshold value according to the fifth embodiment. For example, as illustrated in FIG. 16, a difference between the threshold value TD and the light amount adjustment value C is about 30 bits. For example, the threshold value TD may be changed according to the number of printed sheets, or may be changed according to the average value or the median value of the light amount adjustment values.

According to the fifth embodiment, in addition to the effects of the first to fourth embodiments, the following effects can be obtained. The image forming apparatus 1 can control the output of the information in comparison with the model M/C. Therefore, it is possible to review how much the target M/C (that is, the image forming apparatus 1) is being used as compared with the model M/C, and what kind of usage method is being used, such that image quality can be improved and an image defect can be prevented.

Sixth Embodiment

Basic configurations of the image forming apparatus 1, the sensor 17, and the server 2 of a sixth embodiment are the same as those of the image forming apparatus 1, the sensor 17, and the server 2 illustrated in FIGS. 1, 2, 3, 11, and 12 of the first and third embodiments.

The overall operation by the image forming apparatus 1 according to the sixth embodiment and a light amount correction processing operation by the image forming apparatus 1 according to the sixth embodiment are the same as the overall operation and the light amount correction processing operation illustrated in FIGS. 5 and 6 of the first embodiment.

Hereinafter, an information output processing operation of the image forming apparatus 1 according to the sixth embodiment will be described with reference to FIG. 17.

Figure 17:
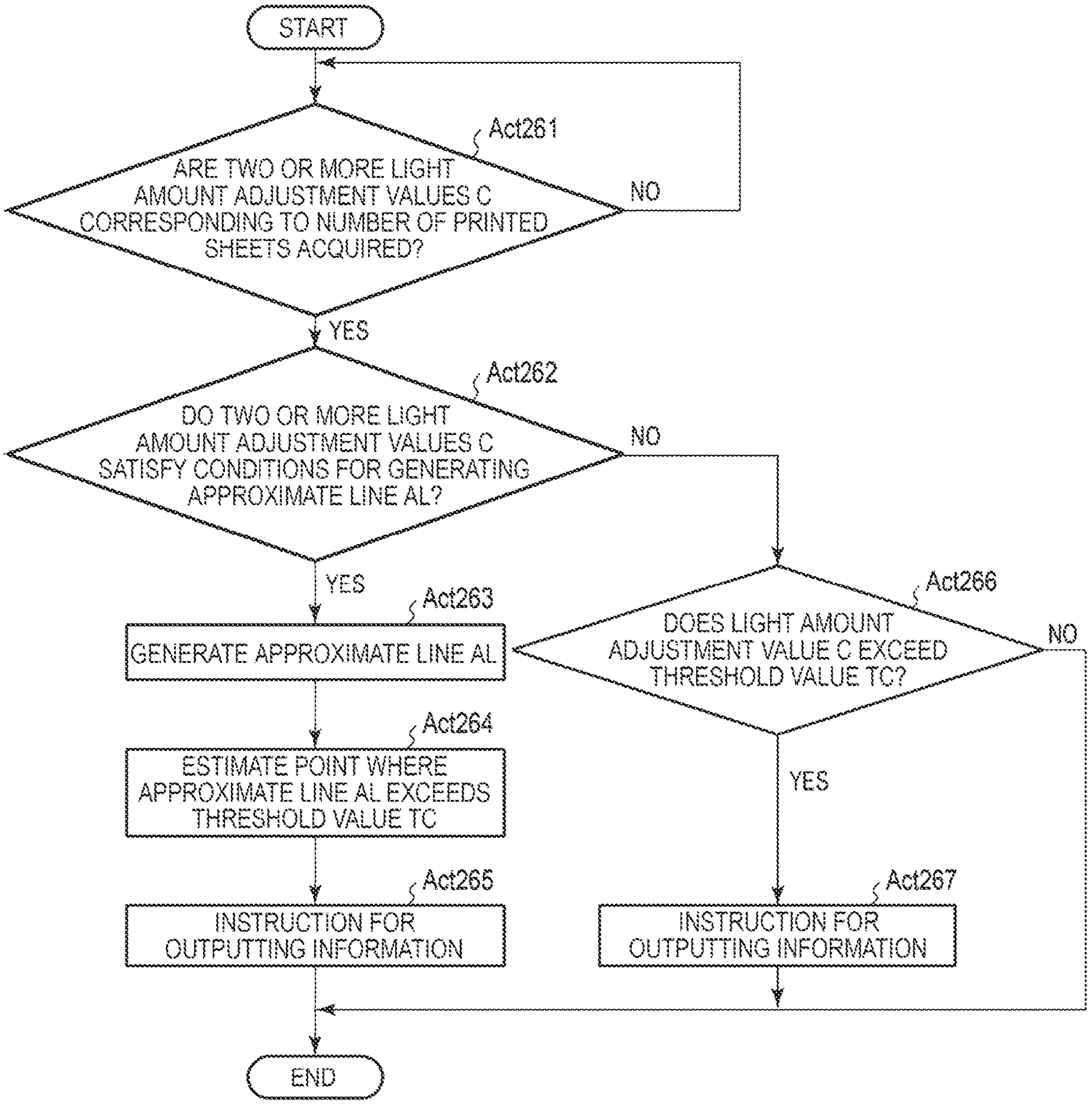
FIG. 17 is a flowchart illustrating an example of an information output processing operation by an image forming apparatus according to a sixth embodiment.

FIG. 17 is a flowchart illustrating an example of the information output processing operation by the image forming apparatus 1 according to the sixth embodiment. That is, FIG. 17 is a flowchart illustrating details of the information output process of Act 2.

The processor 16 acquires the light amount adjustment value C stored in the memory at a predetermined timing. The processor 16 acquires a plurality of light amount adjustment values C corresponding to different numbers of printed sheets. Alternatively, the processor 16 may acquire a plurality of light amount adjustment values C corresponding to different driving times. The processor 16 provides an instruction for outputting information on occurrence of an event estimated from an amount of change in the light amount adjustment value C between at least two different numbers of printed sheets. That is, the processor 16 estimates or predicts the future occurrence of a defect, such as contamination and the like, of the sensor 17 from the amount of change in the light amount adjustment value C between different numbers of printed sheets (e.g., at least two data points for light amount adjustment values C at different numbers of printed sheets), and provides the instruction for outputting the information on this defect. For example, the processor 16 generates an approximate line AL from the light amount adjustment values C corresponding to two or more values for different numbers of printed sheets, and then estimates (or calculates) a point (the number of printed sheets) where the approximate line AL will exceed the threshold value TC. The processor 16 then provides an instruction for outputting warning information based on the estimation result (that is, the prediction as to the number of printed sheets at which the measured light amount adjustment value C will exceed the threshold value TC).

The processor 16 determines whether or not at least two light amount adjustment values have been acquired (Act 261). In some examples, the processor 20 may perform the above-described process instead of the processor 16. When two or more light amount adjustment values are not acquired (Act 261, NO), the processor 16 acquires the most recent light amount adjustment value C stored in the memory again. By repeatedly performing this process, the processor 16 can eventually acquire two or more light amount adjustment values C.

When two or more light amount adjustment values C have been acquired in Act 261 (Act 261, YES), the processor 16 next determines whether the acquired two or more light amount adjustment values C satisfy a condition for generating the approximate line AL (Act 262). For example, the processor 16 will not generate (or use) the approximate line AL if the inclination of the approximate line AL is such that the estimated light amount adjustment values C for some greater number of printed pages (or driving time) will not exceed the threshold value TC. That is, the approximate line AL is too flat or even a negative slope.

If the image forming apparatus 1 is not cleaned, the light amount adjustment value C generally increases with use/time, however, temporary/local fluctuations are possible. Thus, if the approximate line AL is generated using a data point resulting from a temporary decrease or increase in the light amount such that the approximate line AL has, for example, a negative slope, the approximate line AL is not used for predicting the number of printed sheets (or other use metric) at which the measured light adjustment value C will exceed the threshold value TC.

If the acquired light amount adjustment values C satisfy the condition for generating the approximate line AL (Act 262, YES), the processor 16 generates the approximate line AL (Act 263). After generating the approximate line AL in Act 263, the processor 16 estimates a point exceeding the threshold value TC from the approximate line AL (Act 264). The point estimated by the processor 16 from the approximate line AL is, for example, the light amount adjustment value C corresponding to some future number of printed sheets, and/or a date and time when the light amount adjustment value C is predicted to be reached. The processor 16 may estimate the date and time in this instance based on past data such as a frequency of use, the number of printed sheets output on average, and the like. An item estimated by the processor 16 is not limited to the date and time. For example, the processor 16 may instead or in addition estimate a degree of dirtiness of the sensor, a degree of deterioration in image quality to be expected, and the like.

The processor 16 provides an instruction for outputting information estimated in Act 264 (Act 267). For example, the control panel 15 outputs warning information as an image or a voice.

If the acquired two or more light amount adjustment values C do not satisfy the condition for generating the approximate line AL (Act 262, NO), the processor 16 determines whether the light amount adjustment value C exceeds the threshold value TC (Act 266). The light amount adjustment value C used by the processor 16 at this time is the latest light amount adjustment value C.

When determining that the light amount adjustment value C exceeds the threshold value TC (Act 266, YES), the processor 16 provides the instruction for outputting the information (Act 267). When determining that the light amount adjustment value C is equal to or less than the threshold value TC (Act 266, NO), the processor 16 ends the information output processing operation. Instead of the processor 16, the processor 20 may perform the processes of Act 262 to Act 264 and Act 266 in some examples. If the light amount adjustment value C changes and the processor 16 subsequently determines that the light amount adjustment value C is equal to or less than the threshold value TC, the processor 16 provides an instruction for stopping the output of the information. The processor 16 outputs the warning information based on the information transmitted from the server 2. After that, when receiving the information from the server 2 indicating that the approximate line AL is equal to or less than the threshold value TC or otherwise that cleaning is not required, the processor 16 provides the instruction for stopping the output of the information. Accordingly, the control panel 15 stops the output of the information in progress.

By performing the processes in Act 261 to Act 267, the processor 16 acquires light amount adjustment values (or other information indicating sensor light output levels) corresponding to at least two different numbers of printed sheets (or other use metrics), and generates an approximate line from the acquired light amount adjustment values at these different data points, thereby providing a means to of estimating the time at which light amount adjustment value (or sensor light output level) will exceed a predetermined threshold value based on the generated approximate line. The processor can then output either the prediction and/or warning information accordingly.

Figure 18:
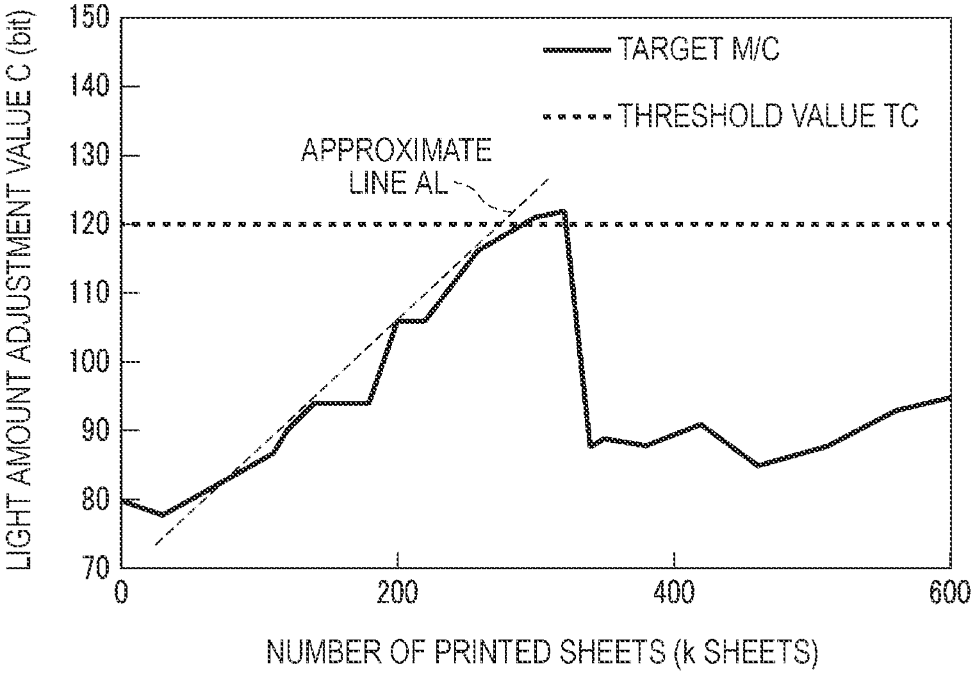
FIG. 18 is a diagram illustrating an example of a change in a light amount adjustment value, a threshold value, and an approximate line.

FIG. 18 is a diagram illustrating an example of a change in the light amount adjustment value, a threshold value, and an approximate line according to the sixth embodiment. For example, as illustrated in FIG. 18, the threshold value TC is 120 bits. It should be noted that the approximate line AL as generated by the processor 16 is not limited to a simple linear function, but may be some non-linear function or modeled statistical function.

According to the sixth embodiment, in addition to the effects of the first to fifth embodiments, the following effects can be obtained. The image forming apparatus 1 estimates (predicts) the occurrence of a threshold crossover event from the amount of change in the light amount adjustment value C for different points of usage, and provides the instruction for outputting the information on the estimated occurrence of the threshold crossover event. Accordingly, the information regarding the estimated occurrence of the threshold crossover event is output. Therefore, the future timing when cleaning will be required can be known or predicted in advance, such that a cleaning schedule by a serviceman can be generated, and/or cleaning can be performed before an actual occurrence of an image defect and deterioration in image quality of the image forming apparatus 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:

a transfer belt onto which toner images are transferred during an image forming operation;

a sensor configured to emit light towards the transfer belt and detect an amount of light reflected by the transfer belt; and a processor configured to:

adjust the amount of light emitted towards the transfer belt based on the detected amount of the reflected light, provide an instruction for outputting warning information when light level information from the sensor indicates an output level for the amount of light emitted towards the transfer belt exceeds a threshold value, wherein the light level information indicating the output level is an adjustment amount from a reference output level, the processor determines the output level exceeds the threshold value when the adjustment amount exceeds a first threshold value, and after providing the instruction for outputting the warning information, the processor is further configured to provide a second instruction to stop the output of the warning information when the adjustment amount is less than a second threshold value that is less than the first threshold value.

2. The image forming apparatus according to claim 1, further comprising:

a user interface that outputs the warning information based on the instruction from the processor.

3. The image forming apparatus according to claim 1, further comprising:

a communication interface configured to transmit the light level information to a server.

4. The image forming apparatus according to claim 3, further comprising:

a user interface configured to provide information corresponding to the light level information, wherein the user interface is further configured to provide information corresponding to the light level information received via the communication interface from the server.

5. The image forming apparatus according to claim 1, wherein the sensor is a toner density sensor.

6. The image forming apparatus according to claim 1, wherein the processor is further configured to:

track the number of sheets processed by the image forming apparatus during a time period, receive information indicating an expected output level for the amount of light emitted towards the transfer belt by the sensor, calculate a difference between the output level and the expected output level, and provide the instruction for outputting the warning information when the calculated difference exceeds a threshold difference amount.

7. The image forming apparatus according to claim 1, wherein the processor is further configured to provide an instruction of outputting an estimated threshold crossover time based on an approximation value calculated from light amount adjustment values measured for at least two different numbers of printed sheets.

8. The image forming apparatus according to claim 7, wherein the approximation value is calculated from a linear function set based on the light amount adjustment values measured for at least two different numbers of printed sheets.

9. A printer, comprising:

a transfer belt from which toner images are transferred to sheets for printing;

a toner sensor configured to emit light towards the transfer belt at an adjustable output level and detect an amount of light reflected by the transfer belt back to the toner sensor; and a processor configured to:

adjust the adjustable output level based on the detected amount of the reflected light such that the detected amount of the reflected light is within a target range, provide an instruction for outputting warning information when the set adjustable output level exceeds a threshold value, track the number of sheets processed by the printer during a time period, receive information indicating an expected setting for the adjustable output level, calculate a difference between the current setting for the adjustable output level and the expected setting for the adjustable output level, and provide the instruction for outputting the warning information when the difference exceeds a threshold difference amount.

10. The printer according to claim 9, further comprising:

a user interface that outputs the warning information based on the instruction from the processor.

11. The printer according to claim 9, wherein the information indicating the expected setting for the adjustable output level is an adjustment amount from a reference output level.

12. The printer according to claim 9, wherein the processor is further configured to provide an instruction of outputting an estimated threshold crossover time based on an approximation value calculated from adjustable output levels settings for at least two different numbers of printed sheets.

13. The printer according to claim 9, further comprising:

a communication interface configured to transmit the adjustable output level to a server.

14. A toner sensor for an image forming apparatus, the toner sensor comprising:

a light emitting element positioned to emit light towards a transfer belt onto which toner images are transferred during an image forming operation;

a light detector positioned to detect an amount of light reflected by the transfer belt; and a processor configured to:

adjust the amount of light emitted towards the transfer belt based on the detected amount of the reflected light, provide an instruction for outputting warning information when light level information from the light detector indicates an output level for the amount of light emitted towards the transfer belt exceeds a threshold value, wherein the light level information indicating the output level is an adjustment amount from a reference output level, the processor determines the output level exceeds the threshold value when the adjustment amount exceeds a first threshold value, and after providing the instruction for outputting the warning information, the processor is further configured to provide a second instruction to stop the output of the warning information when the adjustment amount is less than a second threshold value that is less than the first threshold value.

* * * * *